United States Patent
Shin et al.

(10) Patent No.: US 11,435,789 B2
(45) Date of Patent: Sep. 6, 2022

(54) ELECTRONIC DEVICE HAVING STRUCTURE FOR CONNECTING DISPLAY AND CONDUCTIVE SUPPORT MEMBER THROUGH CONDUCTIVE ADHESIVE MEMBER

(71) Applicant: Samsung Electronics Co., Ltd., Suwon-si (KR)

(72) Inventors: Yongwoog Shin, Suwon-si (KR); Yonghyun Park, Suwon-si (KR); Joonyoung Son, Suwon-si (KR); Kyonghwan Cho, Suwon-si (KR); Sangho Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 17/274,141

(22) PCT Filed: Sep. 5, 2019

(86) PCT No.: PCT/KR2019/011459
§ 371 (c)(1),
(2) Date: Mar. 5, 2021

(87) PCT Pub. No.: WO2020/071647
PCT Pub. Date: Apr. 9, 2020

(65) Prior Publication Data
US 2021/0216112 A1      Jul. 15, 2021

(30) Foreign Application Priority Data
Oct. 2, 2018   (KR) .................. 10-2018-0117377

(51) Int. Cl.
*G06F 1/16*   (2006.01)

(52) U.S. Cl.
CPC .......... *G06F 1/1698* (2013.01); *G06F 1/1652* (2013.01); *G06F 1/1656* (2013.01)

(58) Field of Classification Search
CPC ..... G06F 1/1652; G06F 1/1656; G06F 1/1698
See application file for complete search history.

(56) References Cited

U.S. PATENT DOCUMENTS

| 6,768,524 B2 | 7/2004 | Ju |
| 7,569,410 B2 * | 8/2009 | Hartzell ................ B81C 1/0023 438/106 |

(Continued)

FOREIGN PATENT DOCUMENTS

| EP | 3324604 A1 | 5/2018 |
| KR | 10-0394151 B1 | 8/2003 |

(Continued)

OTHER PUBLICATIONS

International Search Report dated Jan. 31, 2020 in connection with International Patent Application No. PCT/KR2019/011459, 2 pages.

*Primary Examiner* — Adrian S Wilson

(57) ABSTRACT

Disclosed is a portable communication device comprising: a display module comprising a display layer facing the front surface of the portable communication device, and a conductive layer formed beneath the display layer; a conductive supporting member arranged beneath the conductive layer; an antenna module arranged adjacent to the side of the conductive supporting member; a printed circuit board which is arranged beneath the conductive layer, and which has a display driving circuit arranged therein for controlling the display module; and a conductive adhesive layer arranged between the conductive layer and the conductive supporting member.

15 Claims, 13 Drawing Sheets

(56) References Cited

U.S. PATENT DOCUMENTS

| | | | |
|---|---|---|---|
| 8,562,163 B2* | 10/2013 | Lin | H05K 9/0026 |
| | | | 362/631 |
| 8,583,187 B2 | 11/2013 | Kim et al. | |
| 9,402,302 B2* | 7/2016 | Kim | H05K 1/0218 |
| 9,946,119 B2* | 4/2018 | Fujita | G06F 1/1601 |
| 10,031,553 B2 | 7/2018 | Yang | |
| 10,134,540 B2 | 11/2018 | Choi et al. | |
| 10,396,434 B2 | 8/2019 | Koo et al. | |
| 2002/0159000 A1 | 10/2002 | Ju | |
| 2005/0041166 A1* | 2/2005 | Yamazaki | H01L 29/66757 |
| | | | 257/E27.113 |
| 2006/0012969 A1* | 1/2006 | Bachman | H05K 9/00 |
| | | | 174/378 |
| 2006/0214849 A1* | 9/2006 | Fabrega-Sanchez | H01Q 1/48 |
| | | | 343/702 |
| 2009/0122021 A1* | 5/2009 | Liu | G06F 3/0412 |
| | | | 345/173 |
| 2009/0280757 A1* | 11/2009 | Zhu | H01Q 1/2241 |
| | | | 455/114.1 |
| 2010/0105452 A1* | 4/2010 | Shin | H04B 1/3838 |
| | | | 455/575.8 |
| 2012/0087065 A1 | 4/2012 | Kim et al. | |
| 2013/0147079 A1* | 6/2013 | Ji | B29C 45/0001 |
| | | | 264/105 |
| 2016/0269079 A1* | 9/2016 | Nambord | G06F 1/266 |
| 2017/0207516 A1 | 7/2017 | Koo et al. | |
| 2020/0409426 A1* | 12/2020 | Hong | H01L 23/3114 |
| 2021/0151856 A1* | 5/2021 | Kim | H04M 1/0277 |
| 2021/0152680 A1* | 5/2021 | Lee | H01Q 1/243 |

FOREIGN PATENT DOCUMENTS

| | | |
|---|---|---|
| KR | 10-2005-0061990 A | 6/2005 |
| KR | 10-2006-0023623 A | 3/2006 |
| KR | 10-0803348 B1 | 2/2008 |
| KR | 10-1222388 B1 | 1/2013 |
| KR | 10-2015-0066317 A | 6/2015 |
| KR | 10-2015-0081006 A | 7/2015 |
| KR | 10-2017-0087334 A | 7/2017 |
| KR | 10-1850809 B1 | 4/2018 |

* cited by examiner

ELECTRONIC DEVICE HAVING STRUCTURE FOR CONNECTING DISPLAY AND CONDUCTIVE SUPPORT MEMBER THROUGH CONDUCTIVE ADHESIVE MEMBER

CROSS-REFERENCE TO RELATED APPLICATIONS

This application is a 371 of International Application No. PCT/KR2019/011459 filed on Sep. 5, 2019, which claims priority to Korean Patent Application No. 10-2018-0117377 filed on Oct. 2, 2018, the disclosures of which are herein incorporated by reference in their entirety.

BACKGROUND

1. Field

Various embodiments of the disclosure described herein relate to an electronic device having a structure for connecting a display and a conductive supporting member through a conductive adhesive member.

2. Description of Related Art

Electronic devices, such as smartphones, wearable devices, and the like, which are equipped with antennas have been widely used with the development of mobile communication technologies. The electronic devices receive or transmit signals including data (e.g., a message, a photo, a video, a music file, a game, or the like) using the antennas. The electronic devices transfer signals received through the antennas to radio frequency integrated circuits (RFICs).

With the compactness of the electronic devices, the electronic devices may use parts of side bezel structures of the electronic devices as parts (e.g., radiators) of the antennas to more efficiently receive or transmit signals in limited mounting spaces. For example, an electronic device may transmit and receive wireless signals in a specified frequency band using at least part of a side bezel structure located in an upper portion and/or a lower portion of the electronic device.

Displays of electronic devices have become larger. For example, an electronic device may include, on the front thereof, a bezel-less display or a full display that does not include a bezel. Due to the large area display of the electronic device, the distance between the front display and a side bezel structure of the electronic device may be decreased. As the distance between the side bezel structure and the display is decreased, electrical coupling between the side bezel structure and the display may be strengthened.

The display may include a display panel including a plurality of pixels and a display driver IC configured to control the display. The display may include a conductive sheet (e.g., a copper (Cu) sheet) disposed on a rear surface of the display to prevent noise generated from the display panel from being introduced into an internal circuit of the electronic device. In general, the display driver IC has a relatively high operation clock, and therefore noise may be generated from the display driver IC and a display power supply.

As the strength of coupling between the display and the side bezel structure is increased, the noise generated from the display driver IC may be introduced into the side bezel structure through the conductive sheet. In this case, due to the introduction of the noise, the receiving sensitivity of an antenna using the side bezel structure may be reduced.

In various embodiments of the disclosure, an electronic device having a structure for preventing a reduction in the receiving sensitivity of an antenna may be provided.

SUMMARY

A portable communication device according to an embodiment of the disclosure includes a display module including a display layer that faces toward a front surface of the portable communication device and a conductive layer formed under the display layer, a conductive supporting member disposed under the conductive layer, an antenna module disposed close to a side of the conductive supporting member, a printed circuit board that is disposed under the conductive layer and that has a display driver IC disposed thereon to control the display module, and a conductive adhesive layer disposed between the conductive layer and the conductive supporting member.

An electronic device according to an embodiment of the disclosure includes a display module including a display panel having an upper surface disposed to face toward a front surface of the electronic device, a conductive layer disposed on a lower surface of the display panel, and a printed circuit board including a driver IC of the display panel, a conductive supporting member disposed under the conductive layer, a conductive radiator that is located on an upper or lower side of the electronic device so as to be adjacent to the conductive supporting member and that transmits and receives a wireless signal in a specified band, at least part of the conductive radiator being visible through a side surface of the electronic device, and a conductive adhesive layer that is located between the conductive layer and the conductive supporting member and that bonds at least part of the display module to the conductive supporting member.

According to the various embodiments of the disclosure, a reduction in the receiving sensitivity of the antenna may be prevented by using the conductive adhesive layer.

According to the various embodiments of the disclosure, through double-coupling of the conductive sheet of the display panel and the bracket, the electronic device may prevent an electric shock that is likely to occur due to electrical charges transferred from the display panel to the side member through the bracket.

In addition, the disclosure may provide various effects that are directly or indirectly recognized.

BRIEF DESCRIPTION OF THE DRAWINGS

FIG. 7 illustrates the position of the conductive adhesive layer.

With regard to description of the drawings, identical or similar reference numerals may be used to refer to identical or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
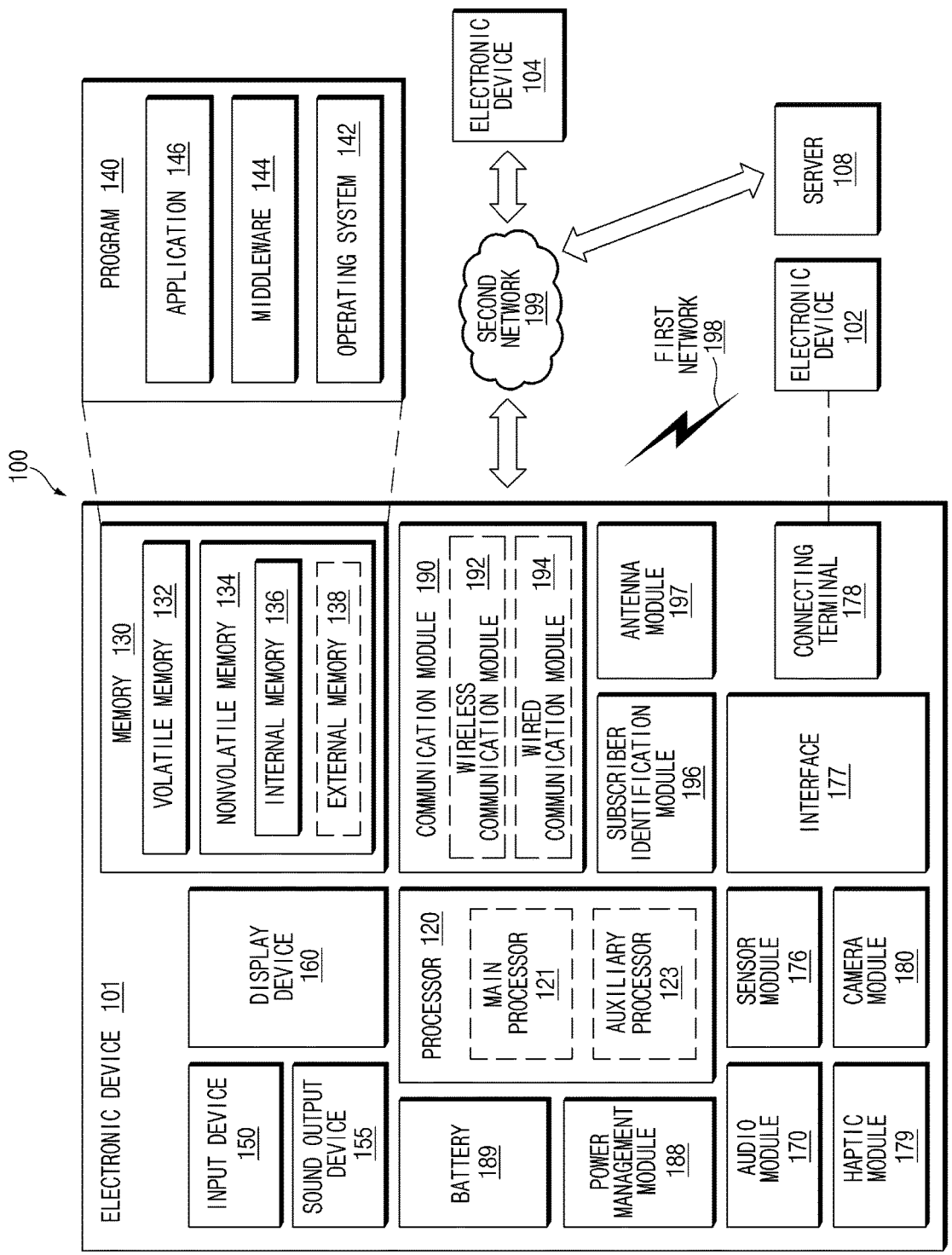
FIG. 1 illustrates a block diagram of an electronic device in a network according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
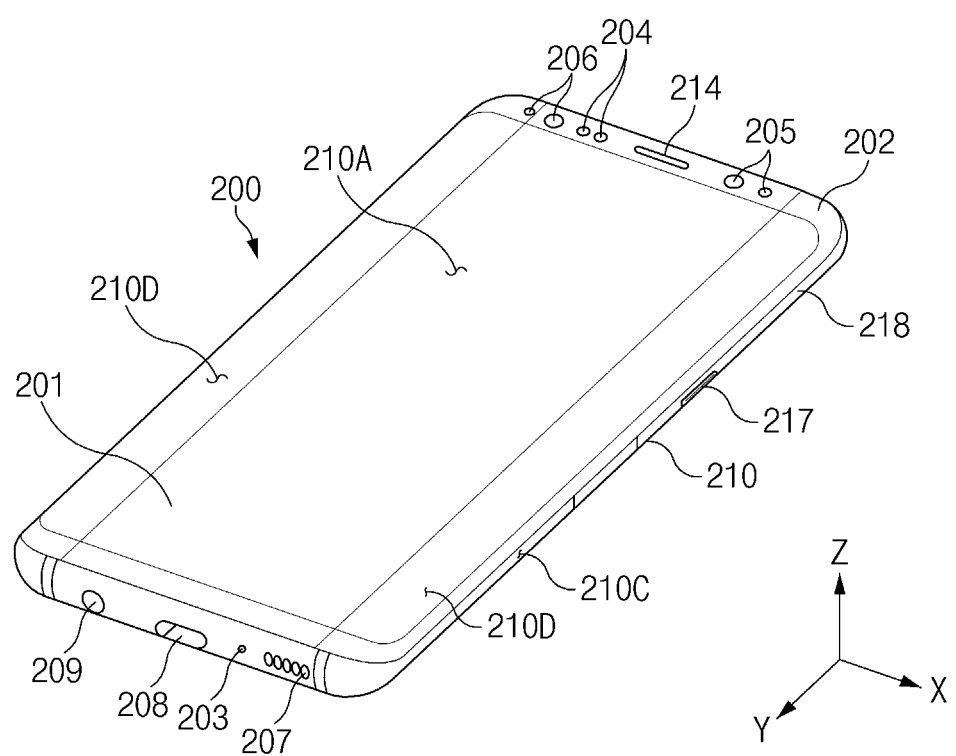
FIG. 2 is a front perspective view of a mobile electronic device according to an embodiment.
Figure 3:
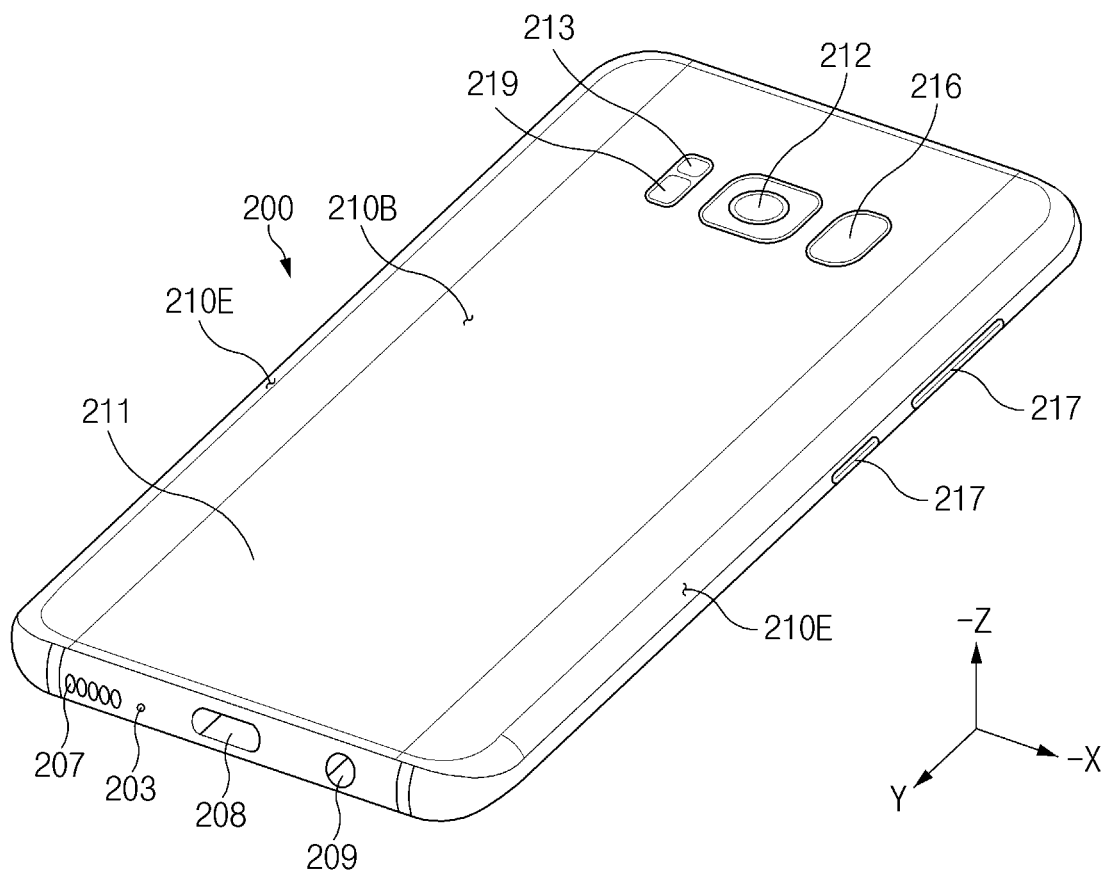
FIG. 3 is a rear perspective view of the electronic device of FIG. 2.

Referring to FIGS. 2 and 3, an electronic device 200 (e.g., the electronic device 101 of FIG. 1) according to an embodiment may include a housing 210 that includes a first surface (or, a front surface) 210A, a second surface (or, a rear surface) 210B, and side surfaces 210C that surround a space between the first surface 210A and the second surface 210B. In another embodiment (not illustrated), a housing may refer to a structure that forms some of the first surface 210A, the second surface 210B, and the side surfaces 210C of FIG. 2. According to an embodiment, the first surface 210A may be formed by a front plate 202, at least part of which is substantially transparent (e.g., a glass plate including various coating layers, or a polymer plate). The second surface 210B may be formed by a back plate 211 that is substantially opaque. The back plate 211 may be formed of, for example, coated or colored glass, ceramic, polymer, metal (e.g., aluminum, stainless steel (STS), or magnesium), or a combination of at least two of the aforementioned materials. The side surfaces 210C may be formed by a side bezel structure (or, a "side member") 218 that is coupled with the front plate 202 and the back plate 211 and that contains metal and/or polymer. In some embodiments, the back plate 211 and the side bezel structure 218 may be integrally formed with each other and may contain the same material (e.g., a metallic material such as aluminum).

In the illustrated embodiment, the front plate 202 may include, at opposite long edges thereof, two first regions 210D that curvedly and seamlessly extend from the first surface 210A toward the back plate 211. In the illustrated embodiment (refer to FIG. 3), the back plate 211 may include, at opposite long edges thereof, two second regions 210E that curvedly and seamlessly extend from the second surface 210B toward the front plate 202. In some embodiments, the front plate 202 (or, the back plate 211) may include only one of the first regions 210D (or, the second regions 210E). In another embodiment, a part of the first regions 210D or the second regions 210E may not be included. In the embodiments, when viewed from a side of the electronic device 200, the side bezel structure 218 may have a first thickness (or, width) at sides not including the first regions 210D or the second regions 210E and may have a second thickness at sides including the first regions 210D or the second regions 210E, the second thickness being smaller than the first thickness.

According to an embodiment, the electronic device 200 may include at least one of a display 201 (e.g., the display device 160 of FIG. 1), audio modules 203, 207, and 214 (e.g., the sound output device 155 and/or the audio module 170 of FIG. 1), sensor modules 204, 216, and 219 (e.g., the sensor module 176 of FIG. 1), camera modules 205, 212, and 213 (e.g., the camera module 180 of FIG. 1), key input devices 217 (e.g., the interface 177 of FIG. 1), a light emitting element 206 (e.g., the interface 177 of FIG. 1), or connector holes 208 and 109. In some embodiments, the electronic device 200 may omit at least one component (e.g., the key input devices 217 or the light emitting element 206) among the aforementioned components, or may additionally include other component(s).

The display 201, for example, may be exposed through most of the front plate 202. In some embodiments, at least part of the display 201 may be exposed through the front plate 202 that forms the first surface 210A and the first regions 210D of the side surfaces 210C. In some embodiments, the periphery of the display 201 may be formed to be substantially the same as the shape of the adjacent outside edge of the first plate 202. In another embodiment (not illustrated), to expand the area by which the display 201 is exposed, the gap between the outside edge of the display 201 and the outside edge of the front plate 202 may be formed to be substantially constant.

In another embodiment (not illustrated), a recess or opening may be formed in a portion of a screen display area of the display 201, and the electronic device 200 may include at least one of the audio module 214, the sensor module 204, the camera module 205, or the light emitting element 206 that is aligned with the recess or the opening. In another embodiment (not illustrated), the electronic device 200 may include, on a rear surface of the screen display area of the display 201, at least one of the audio module 214, the sensor module 204, the camera module 205, the fingerprint sensor 216 (e.g., the sensor module 176 of FIG. 1), or the light emitting element 206. In another embodiment (not illustrated), the display 201 may be coupled with, or disposed adjacent to, touch detection circuitry, a pressure sensor for measuring the intensity (pressure) of a touch, and/or a digitizer for detecting a stylus pen of a magnetic field type. In some embodiments, at least a part of the sensor modules 204 and 219 and/or at least a part of the key input devices 217 may be disposed in the first regions 210D and/or the second regions 210E.

The audio modules 203, 207, and 214 may include the microphone hole 203 and the speaker holes 207 and 214. A microphone for obtaining a sound from the outside may be disposed in the microphone hole 203, and in some embodiments, a plurality of microphones may be disposed in the microphone hole 203 to sense the direction of a sound. The speaker holes 207 and 214 may include the external speaker hole 207 and the receiver hole 214 for a telephone call. In some embodiments, the speaker holes 207 and 214 and the microphone hole 203 may be implemented with a single hole, or a speaker (e.g., a piezoelectric speaker) may be included without the speaker holes 207 and 214.

The sensor modules 204, 216, and 219 may generate an electrical signal or a data value that corresponds to an operational state inside the electronic device 200 or an environmental state external to the electronic device 200. The sensor modules 204, 216, and 219 may include, for example, the first sensor module 204 (e.g., a proximity sensor) and/or the second sensor module (not illustrated) (e.g., a fingerprint sensor) that is disposed on the first surface 210A of the housing 210, and/or the third sensor module 219 (e.g., an HRM sensor) (e.g., the sensor module 176 of FIG. 1) and/or the fourth sensor module 216 (e.g., a fingerprint sensor) that is disposed on the second surface 210B of the housing 210. The fingerprint sensor may be disposed not only on the first surface 210A of the housing 210 (e.g., the display 201) but also on the second surface 210B. The electronic device 200 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or the illuminance sensor 204.

The camera modules 205, 212, and 213 may include the first camera device 205 disposed on the first surface 210A of the electronic device 200, and the second camera device 212 and/or the flash 213 disposed on the second surface 210B. The camera devices 205 and 212 may include one or more lenses, an image sensor, and/or an image signal processor. The flash 213 may include, for example, a light emitting diode or a xenon lamp. In some embodiments, two or more lenses (an IR camera lens, a wide angle lens, and a telephoto lens) and image sensors may be disposed on one surface of the electronic device 200.

The key input devices 217 may be disposed on the side surfaces 210C of the housing 210. In another embodiment, the electronic device 200 may not include all or some of the aforementioned key input devices 217, and the key input devices 217 not included may be implemented in different forms such as soft keys on the display 201. In some embodiments, the key input devices may include the sensor module 216 disposed on the second surface 210B of the housing 210.

The light emitting element 206, for example, may be disposed on the first surface 210A of the housing 210. The light emitting element 206, for example, may provide state information of the electronic device 200 in the form of light. In another embodiment, the light emitting element 206 may provide, for example, a light source that operates in conjunction with the camera module 205. The light emitting element 206 may include, for example, an LED, an IR LED, and a xenon lamp.

The connector holes 208 and 109 may include the first connector hole 208 for accommodating a connector (e.g., a USB connector) for transmitting and receiving electric power and/or data with an external electronic device, and/or the second connector hole (e.g., an earphone jack) 109 for accommodating a connector for transmitting and receiving audio signals with an external electronic device.

Figure 4:
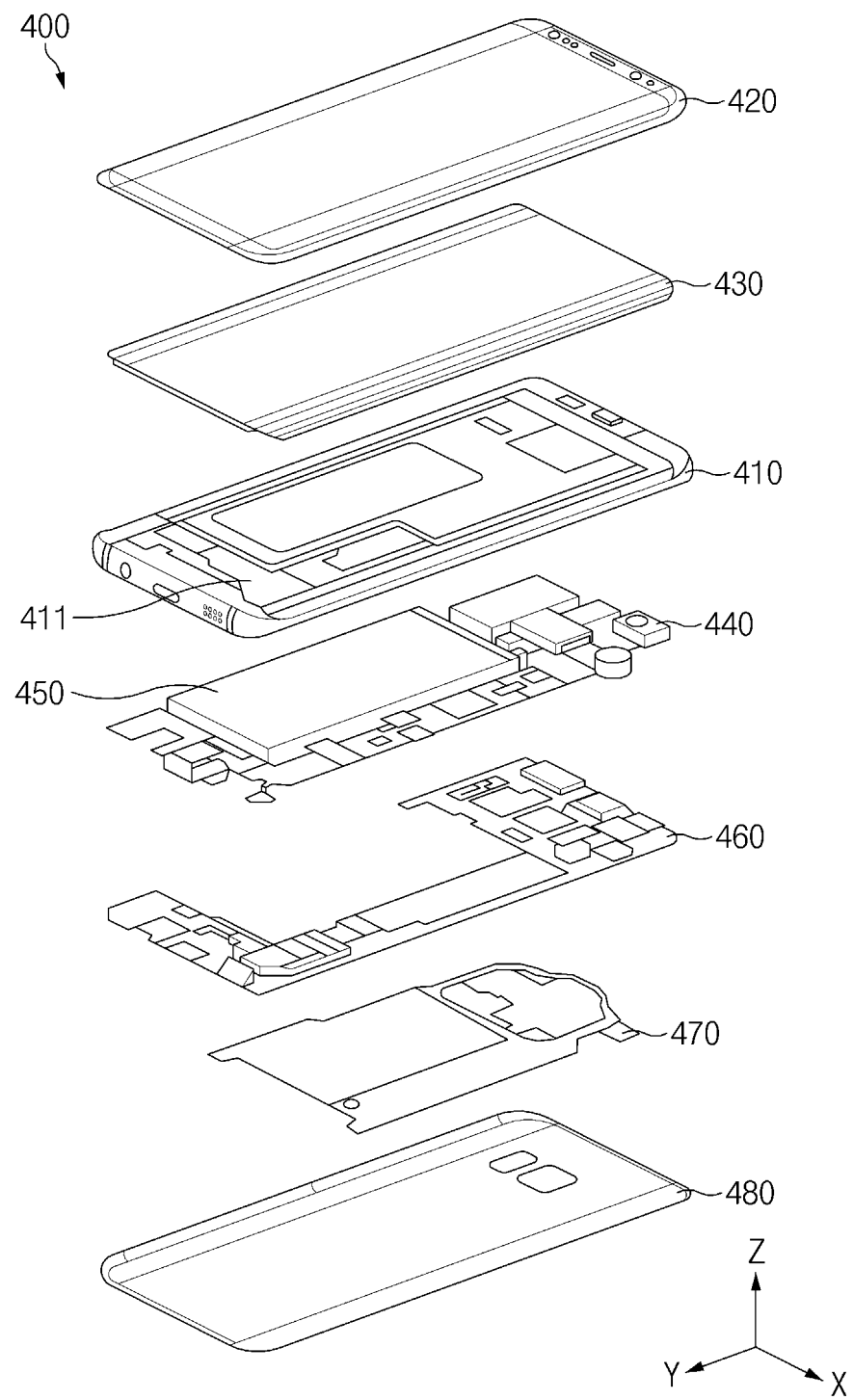
FIG. 4 is an exploded perspective view of the electronic device of FIG. 2.

Referring to FIG. 4, an electronic device 400 (e.g., the electronic device 101) may include a side bezel structure 410, a first support member 411 (e.g., a bracket), a front plate 420, a display 430, a printed circuit board 440, a battery 450 (e.g., the battery 189 of FIG. 1), a second support member 460 (e.g., a rear case), an antenna 470 (e.g., the antenna module 197 of FIG. 1), and a back plate 480. In some embodiments, the electronic device 400 may omit at least one component (e.g., the first support member 411 or the second support member 460) among the aforementioned components, or may additionally include other component(s). At least one of the components of the electronic device 400 may be the same as, or similar to, at least one of the components of the electronic device 200 of FIG. 2 or 3, and repetitive descriptions will hereinafter be omitted.

The first support member 411 may be disposed inside the electronic device 400 and may be connected with the side bezel structure 410, or may be integrally formed with the side bezel structure 410. The first support member 411 may be formed of, for example, a metallic material and/or a nonmetallic (e.g., polymer) material. The display 430 (e.g., the display device 160 of FIG. 1) may be coupled to one surface of the first support member 411, and the printed circuit board 440 may be coupled to an opposite surface of the first support member 411. A processor (e.g., the processor 120 and/or the communication module 190), a memory (e.g., the memory 130), and/or an interface (e.g., the interface 177) may be mounted on the printed circuit board 440. The processor may include, for example, one or more of a central processing unit, an application processor, a graphic processing unit, an image signal processor, a sensor hub processor, or a communication processor.

The memory may include, for example, a volatile memory (e.g., the volatile memory 132 of FIG. 1) or a non-volatile memory (e.g., the non-volatile memory 134 of FIG. 1).

The interface may include, for example, a high definition multimedia interface (HDMI), a universal serial bus (USB) interface, an SD card interface, and/or an audio interface. The interface, for example, may electrically or physically connect the electronic device 400 with an external electronic device and may include a USB connector, an SD card/MMC connector, or an audio connector.

The battery 450, which is a device for supplying electric power to at least one component of the electronic device 400, may include, for example, a primary cell that is not rechargeable, a secondary cell that is rechargeable, or a fuel cell. At least part of the battery 450, for example, may be disposed on substantially the same plane as the printed circuit board 440. The battery 450 may be integrally disposed inside the electronic device 400, or may be disposed so as to be detachable from the electronic device 400.

The antenna 470 may be disposed between the back plate 480 and the battery 450. The antenna 470 may include, for example, a near field communication (NFC) antenna, a wireless charging antenna, and/or a magnetic secure transmission (MST) antenna. The antenna 470, for example, may perform short-range communication with an external device, or may wirelessly transmit and receive electric power required for charging. In another embodiment, an antenna structure may be formed by part of the side bezel structure 410 and/or part of the first support member 411, or a combination thereof.

Figure 5:
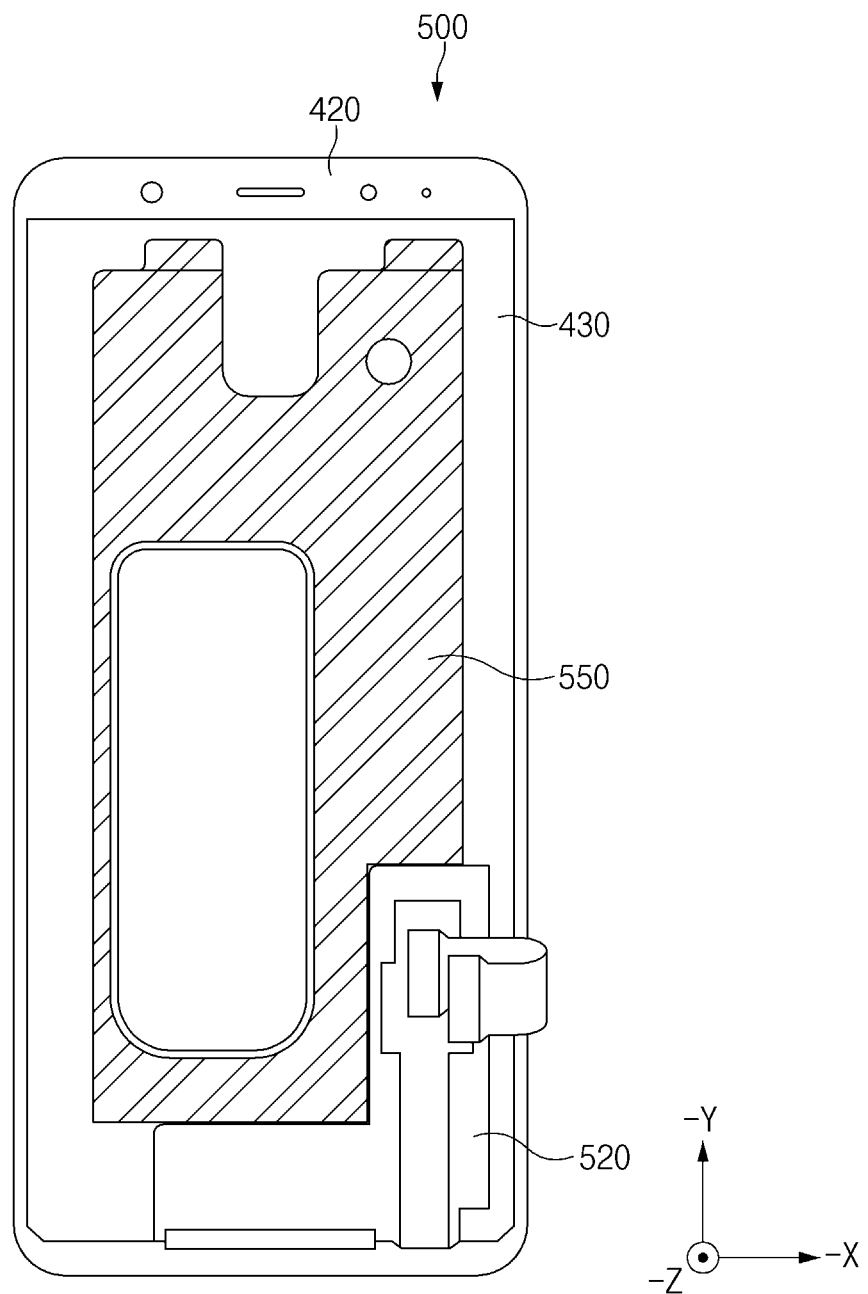
FIG. 5 is a view illustrating the position of a conductive adhesive layer relative to a front plate according to various embodiments.

FIG. 5 is a view 500 illustrating the position of a conductive adhesive layer 550 relative to the front plate 420 according to various embodiments.

FIG. 5 may correspond to a view illustrating some components of the electronic device 101 when the front plate 420, the display 430, and the conductive adhesive layer 550 (e.g., a conductive adhesive member) of the electronic device (e.g., the electronic device 101 of FIG. 1) are viewed in the front direction (e.g., the +Z direction) from the rear of the electronic device 101.

Referring to FIG. 5, according to various embodiments, the display 430 (e.g., the display device 160 of FIG. 1) may include a display layer (e.g., a display panel) disposed to face toward the front of the electronic device 101 (e.g., the +Z direction) so as to be visible from the outside through at least part of the front plate 420 and a printed circuit board 520 on which a driver IC of the display panel is disposed.

According to an embodiment, the display 430 may include a conductive layer disposed on a rear surface of the display panel. For example, the conductive layer may be a metal foil. For example, the conductive layer may be a copper sheet.

According to an embodiment, the display 430 may include a cushion layer located between the conductive layer and the display panel. For example, the cushion layer may be used to protect the display panel from physical impact.

According to an embodiment, the printed circuit board 520 may be disposed under the conductive layer (e.g., a first region) and may include the driver IC for driving the display panel. For example, the printed circuit board 520 may extend from one end (e.g., a lower end) of the display panel and may be a flexible printed circuit board. For example, the printed circuit board 520 may be connected to a main printed circuit board (e.g., the printed circuit board 440 of FIG. 4) of the electronic device 101. For example, the printed circuit board 520 may pass through a conductive supporting member (e.g., the first support member 411 of FIG. 4) located under the display panel and may be connected to the main printed circuit board located under the conductive supporting member. For example, the printed circuit board 520 may be connected to the main printed circuit board through a hole formed in a portion of the conductive supporting member.

According to an embodiment, the conductive adhesive layer 550 may be a heat reactive tape having adhesiveness on opposite sides of the conductive adhesive layer 550. For example, the conductive adhesive layer 550 may be located under the display 430 and may be used to fix the display 430 to the conductive supporting member located under the conductive adhesive layer 550. According to an embodiment, the conductive adhesive layer 550 may be formed to transfer at least part of a noise signal generated by the driver IC of the circuit board 520 to the conductive supporting member. For example, noise generated by the driver IC of the circuit board 520 may be transferred to the conductive layer located on the rear of the display 430 and may be transferred to the conductive supporting member through the conductive adhesive layer 550. For example, the conductive adhesive layer 550 may be formed such that at least part of a noise signal generated by the driver IC and induced to the conductive layer is transferred to the conductive supporting member through the conductive adhesive layer 550.

According to an embodiment, a first insulating layer may be located under the conductive layer of the display 430. For example, the first insulating layer may be located between the conductive layer and the conductive adhesive layer 550. For example, the first insulating layer may provide insulation for the conductive layer. For example, the conductive layer may be formed of polyethylene terephthalate (PET). For example, the electronic device 500 may include the first insulating layer between the conductive layer of the display 430 and the conductive adhesive layer 550, and the conductive adhesive layer 550 may be electrically coupled with the conductive layer. For example, a noise signal induced to the conductive layer may be transferred to the conductive supporting member, based on electrical coupling between the conductive layer and the conductive adhesive layer 550.

According to an embodiment, the printed circuit board 520 may have a first area (e.g., the area of the printed circuit board 520 on the X-Y plane), and the conductive adhesive layer 550 may have a second area (e.g., the area of the conductive adhesive layer 550 on the X-Y plane). For example, the second area may be larger than the first area. For example, the second area may be at least about two times larger than the first area. The shape of the conductive adhesive layer 550 of FIG. 5 is illustrative, and embodiments of the disclosure are not limited thereto.

Figure 13:
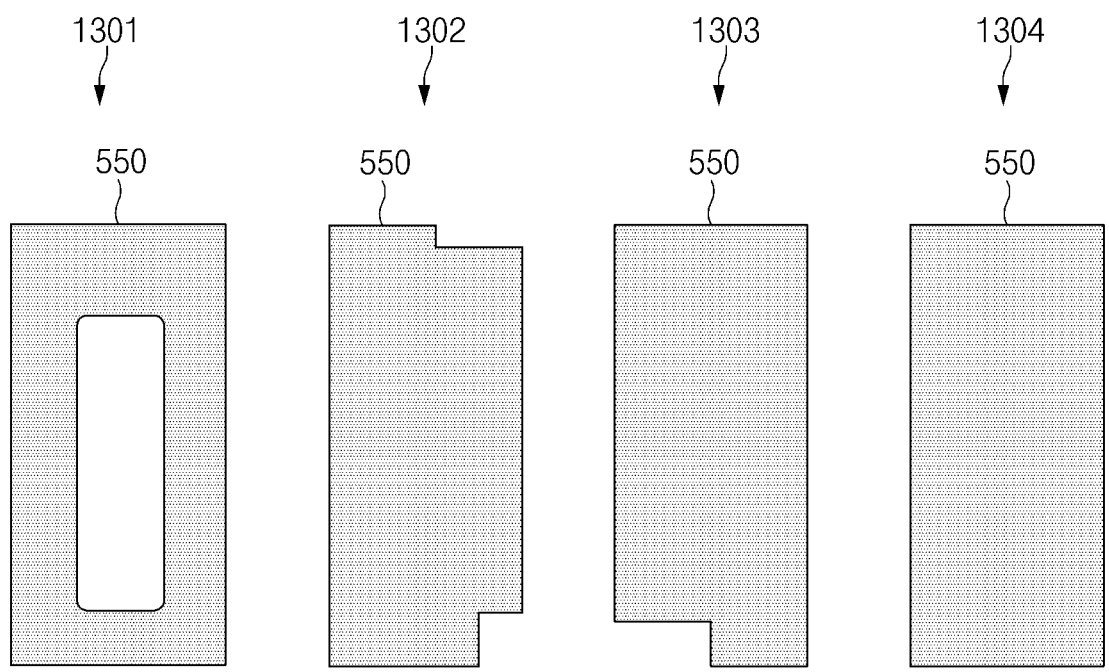
FIG. 13 illustrates shapes of the conductive adhesive layer according to various embodiments.

FIG. 13 illustrates shapes of the conductive adhesive layer 550 according to various embodiments.

According to various embodiments, the conductive adhesive layer 550 may have various shapes. For example, the conductive adhesive layer 550 may be differently formed depending on the shape of the electronic device 101, the shape of the conductive supporting member (e.g., the first support member 411 of FIG. 4), and/or the shape of the printed circuit board 520.

According to an embodiment, referring to reference numeral 1301, the conductive adhesive layer 550 may include at least one opening. Although only one opening is illustrated in FIG. 13, the conductive adhesive layer 550 may include a plurality of openings. According to an embodiment, the opening may be formed to at least partially overlap the battery when viewed from the front of the electronic device 101. The position and the shape of the opening of FIG. 13 are illustrative, and embodiments of the disclosure are not limited thereto.

According to an embodiment, referring to reference numerals 1302 and 1303, the conductive adhesive layer 550 may include at least one protruding portion. For example, referring to reference numeral 1302, the conductive adhesive layer 550 may include an upper protruding portion and a lower protruding portion. In another example, referring to reference numeral 1303, the conductive adhesive layer 550 may include a lower protruding portion. According to an embodiment, the protruding portions of the conductive adhesive layer 550 may be differently formed depending on the shape of the electronic device 101, the shape of the conductive supporting member (e.g., the first support member 411 of FIG. 4), a bonding process, and/or the shape of the printed circuit board 520. The number, positions, and shapes of protruding portions illustrated in FIG. 13 are illustrative, and embodiments of the disclosure are not limited thereto.

According to an embodiment, referring to reference numeral 1304, the conductive adhesive layer 550 may not include an opening and a protruding portion.

Referring again to FIG. 5, according to an embodiment, the conductive adhesive layer 550 may be disposed to at least partially overlap the printed circuit board 520 when viewed from one side of the electronic device 101. For example, at least part of the conductive adhesive layer 550 may overlap at least part of the printed circuit board 520 on the Z-axis when viewed in the left direction (e.g., the −X direction) from the right of the electronic device 101 or in the right direction (e.g., the +X direction) from the left of the electronic device 101. In another example, at least part of the conductive adhesive layer 550 may overlap at least part of the printed circuit board 520 on the Z-axis when viewed in the lower direction (e.g., the +Y direction) from the top of the electronic device 101 or in the upper direction (e.g., the −Y direction) from the bottom of the electronic device 101. An insulating layer disposed between the conductive adhesive layer 550 and the printed circuit board 520 may be located in the region where the conductive adhesive layer 550 and the printed circuit board 520 overlap each other.

According to an embodiment, the conductive adhesive layer 550 may be disposed so as not to overlap the printed circuit board 520 when viewed in one direction of the electronic device 101. For example, the conductive adhesive layer 550 may not overlap the printed circuit board 520 when viewed in the front direction (e.g., the +Z direction) from the rear of the electronic device 101. In another example, the conductive adhesive layer 550 may have a form not overlapping the printed circuit board 520. In another example, the conductive adhesive layer 550 may be disposed so as not to overlap the printed circuit board 520 on the Z-axis.

Figure 6:
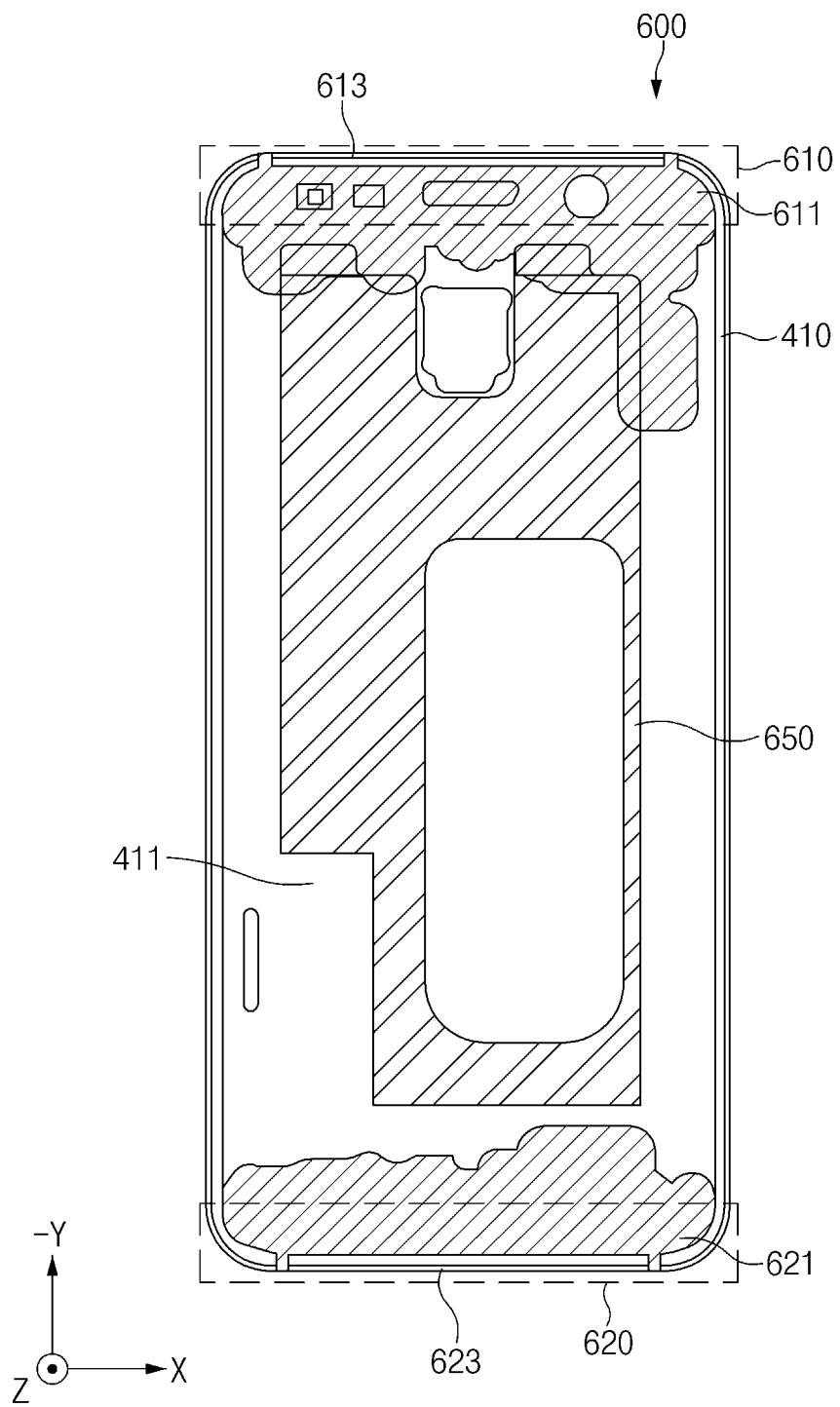
FIG. 6 is a view illustrating the position of the conductive adhesive layer relative to a first support member according to various embodiments.

FIG. 6 is a view 600 illustrating the position of the conductive adhesive layer 550 relative to the first support member 411 according to various embodiments.

FIG. 6 may correspond to a view illustrating some components of the electronic device 101 when the electronic device 101 is viewed in the rear direction (e.g., the −Z direction) from the front of the electronic device 101 after the front plate (e.g., the front plate 420 of FIG. 5) and the display (e.g., the display 430 of FIG. 5) of the electronic device (e.g., the electronic device 101 of FIG. 1) are removed.

Referring to FIG. 6, the electronic device 101 may include the first support member 411 (e.g., a conductive supporting member) and the side bezel structure 410.

According to an embodiment, the first support member 411 may be physically connected with the side bezel structure 410 and may be electrically isolated from at least part of the side bezel structure 410. For example, the first support member 411 may be formed of a conductive material (e.g., metal). For example, the first support member 411 may be referred to as a conductive supporting member. According to an embodiment, the first support member 411 may operate as a ground area for some components (e.g., the printed circuit board 520 of FIG. 5) of the electronic device 101.

According to an embodiment, the side bezel structure 410 may form side surfaces of the electronic device 101 and may be at least partially exposed to the outside. For example, the side bezel structure 410 may include conductive radiators 613 and 623 physically connected with the first support member 411 and electrically isolated from the first support member 411 through insulating layers (e.g., a first insulating layer 611 and a second insulating layer 621).

According to an embodiment, the first conductive radiator 613 may be visible from outside the electronic device 101 and may be configured to transmit and receive signals in a specified band. For example, the first conductive radiator 613 may include at least one feeding point and at least one ground point and may operate as at least part of an antenna. For example, the first conductive radiator 613 may be electrically isolated from the first support member 411 through the first insulating layer 611. For example, the first conductive radiator 613 may be part of a first antenna 610 (e.g., a first antenna module). The first antenna 610 may be disposed close to one side surface of the first support member 411.

According to an embodiment, the second conductive radiator 623 may be visible from outside the electronic device 101 and may be configured to transmit and receive signals in a specified band. For example, the second conductive radiator 623 may include at least one feeding point and at least one ground point and may operate as at least part of an antenna. For example, the second conductive radiator 623 may be electrically isolated from the first support member 411 through the second insulating layer 621. For example, the second conductive radiator 623 may be part of a second antenna 620 (e.g., a second antenna module). The second antenna 620 may be disposed close to one side surface of the second support member 411.

According to an embodiment, a conductive adhesive layer (e.g., the conductive adhesive layer 550 of FIG. 5) may be located on a first region 650 of the first support member 411. Accordingly, the conductive adhesive layer 550 may transfer at least part of a noise signal to the first support member 411 through the first region 650.

Figure 7:
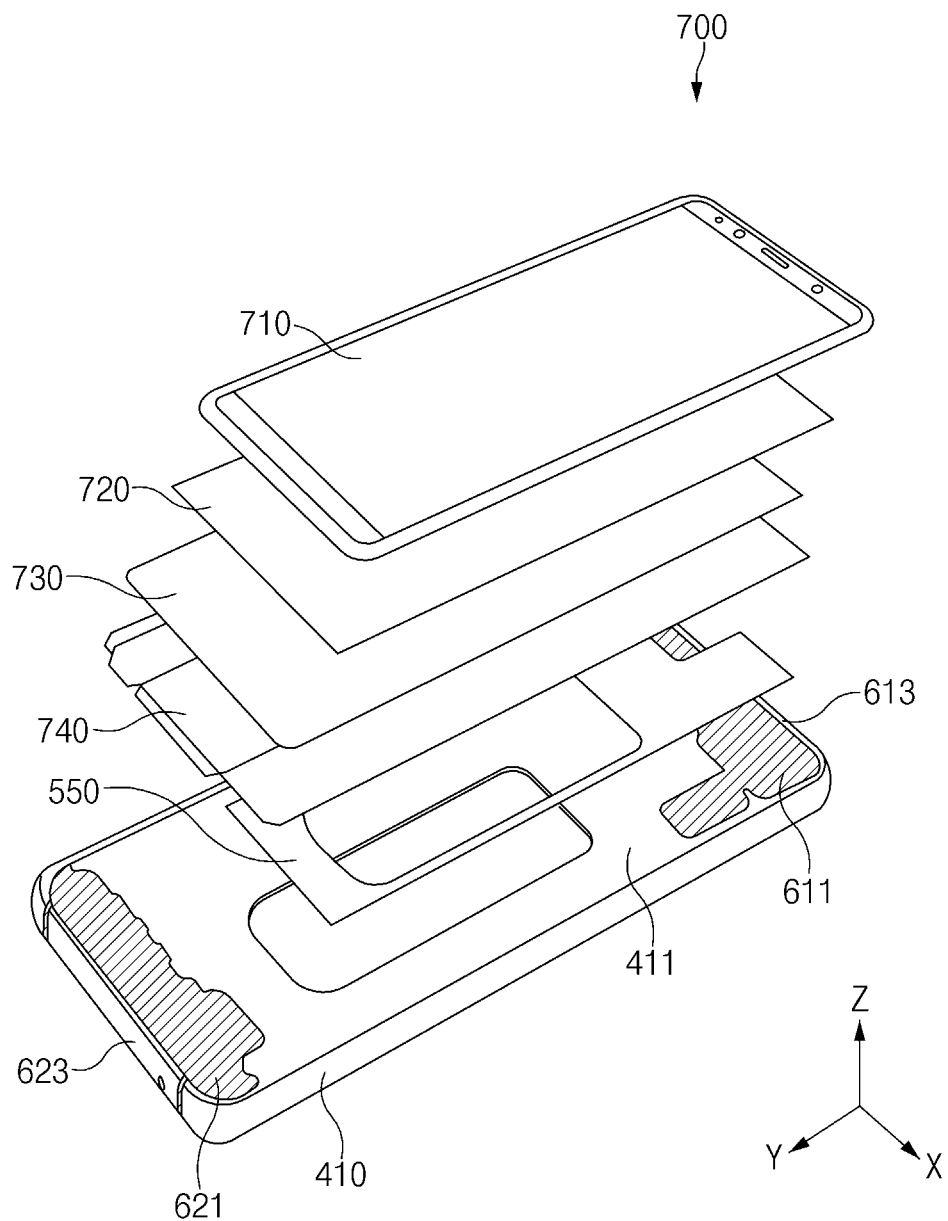
FIG. 7 is an exploded perspective view of the electronic device according to various embodiments, where

FIG. 7 is an exploded perspective view 700 of the electronic device according to various embodiments, where FIG. 7 illustrates the position of the conductive adhesive layer.

According to various embodiments, the electronic device (e.g., the electronic device 101 of FIG. 1) may include, in the lower direction (e.g., the −Z direction) from the top of the electronic device 101, a display panel 710, a cushion layer 720 disposed under the display panel 710, a conductive layer 730 (e.g., a copper sheet) located under the cushion layer 720, a first insulating layer 740 located under the conductive layer 730, the conductive adhesive layer 550 located under the first insulating layer 740, and the first support member 411 located under the conductive adhesive layer 550.

According to an embodiment, the display panel 710 may correspond to the display panel of the display 430 of FIG. 4. For example, a glass cover (e.g., the front plate 420 of FIG. 4) (not illustrated) may be disposed on an upper surface of the display panel 710. According to an embodiment, the cushion layer 720 and the conductive layer 730, together with the display panel 710, may form a display module.

According to an embodiment, the first insulating layer 740 may be a film for insulating the conductive layer 730 from other components of the electronic device 101 and may be formed of PET. For example, the first insulating layer 740 may be used to prevent an electric shock that is likely to be caused by electric current that is generated from the display panel and is transferred to the side bezel structure 410 through the first support member 411.

According to an embodiment, the conductive adhesive layer 550 may be electrically coupled with the conductive layer 730, with the first insulating layer 740 therebetween. For example, the conductive adhesive layer 550 may transfer at least part of a noise signal from the conductive layer 730 to the first support member 411 through the coupling, thereby preventing the noise signal of the conductive layer 730 from being transferred to the first conductive radiator 613 or the second conductive radiator 623. By preventing the transfer of the noise signal, the conductive adhesive layer 550 may prevent the receiving sensitivities of antennas associated with the first conductive radiator 613 and the second conductive radiator 623 from being reduced.

Figure 8:
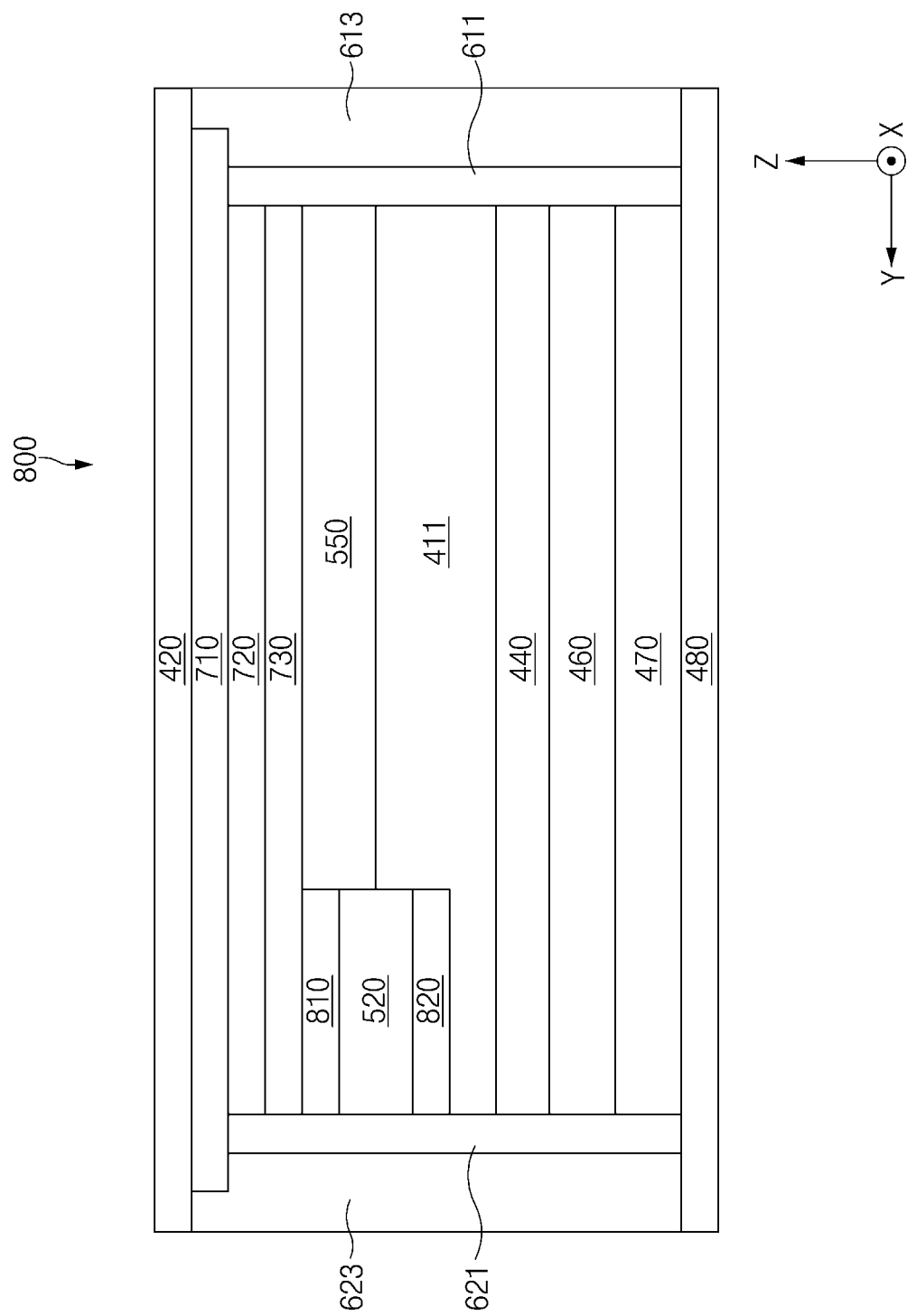
FIG. 8 is a view illustrating a section of the electronic device according to an embodiment.

FIG. 8 is a view 800 illustrating a section of the electronic device according to an embodiment.

FIG. 8 may be a view corresponding to a section of the electronic device 101 when the electronic device 101 is viewed in the left direction (e.g., the −X direction) from the right of the electronic device 101 after the electronic device (e.g., the electronic device 101 of FIG. 1) is cut along the long axis (e.g., the Y-axis of FIG. 2).

According to an embodiment, the electronic device 101 may include the front plate 420, the back plate 480, and the side bezel structure (e.g., the side bezel structure 410 of FIG. 4) that form the exterior of the electronic device 101. The first conductive radiator 613 and the second conductive radiator 623, which are parts of the side bezel structure, are illustrated in FIG. 8.

According to an embodiment, the display module may include the display panel 710 disposed under the front plate 420, the cushion layer 720 located under the display panel 710, the conductive layer 730 located under the cushion layer 720, and the printed circuit board 520 located under the conductive layer 730.

According to an embodiment, a first adhesive layer 810 may be located between the conductive layer 730 and the printed circuit board 520. For example, the first adhesive layer 810 may bond the printed circuit board 520 to the conductive layer 730. For example, the first adhesive layer 810 may be conductive and may electrically connect the printed circuit board 520 and the conductive layer 730. In another example, the first adhesive layer 810 may be nonconductive and may electrically insulate the printed circuit board 520 and the conductive layer 730.

According to an embodiment, a second adhesive layer 820 may be located between the printed circuit board 520 and the first support member 411. For example, the second adhesive layer 820 may bond the printed circuit board 520 to the first support member 411. For example, the second adhesive layer 820 may be formed of a conductive material (e.g., copper) and may electrically connect the printed circuit board 520 to the first support member 411.

According to an embodiment, the conductive adhesive layer 550 may be electrically connected with the conductive layer 730. For example, the conductive adhesive layer 550 may be electrically shorted to the conductive layer 730.

Because the conductive layer 730 is electrically connected with the conductive adhesive layer 550 in the embodiment of FIG. 8, at least part of a noise signal caused by the driver IC of the printed circuit board 520 may be transferred to the first support member 411, which is a conductive member, through the conductive adhesive layer instead of being transferred to the first conductive radiator 613 electrically coupled with the conductive layer 730 with the first insulating layer 611 therebetween and/or the second conductive radiator 623 electrically coupled with the conductive layer 730 with the second insulating layer 621 therebetween. Accordingly, the receiving sensitivities of the antennas associated with the first conductive radiator 613 and/or the second conductive radiator 623 may be prevented from being lowered by the noise signal from the driver IC of the printed circuit board 520.

According to various embodiments, the electronic device 101 may include the printed circuit board 440, the second support member 460, and the antenna 470 that are disposed under the first support member 411. According to an embodiment, the second support member 460 may be omitted.

Figure 9:
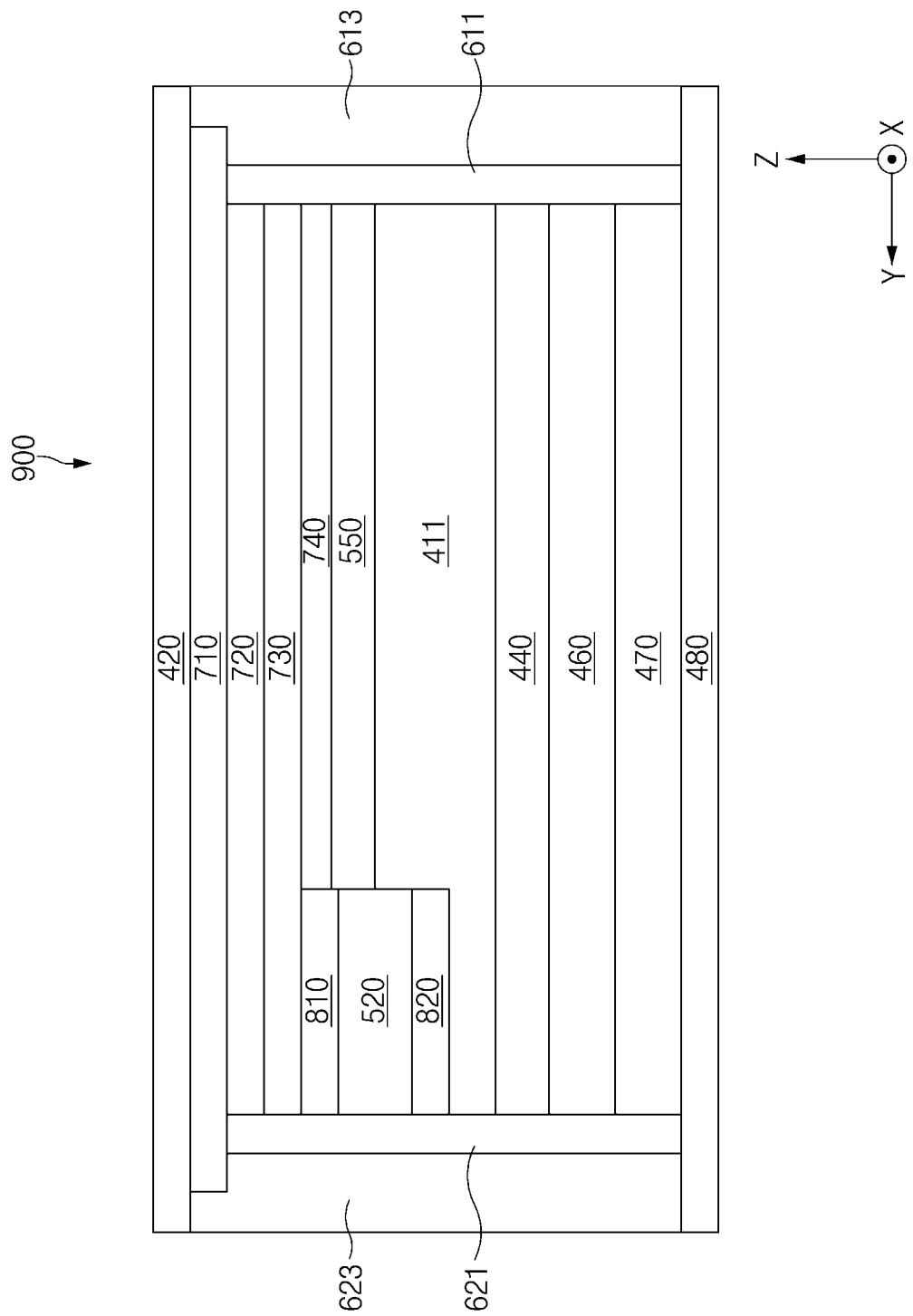
FIG. 9 is a view illustrating a section of the electronic device according to an embodiment.

FIG. 9 is a view 900 illustrating a section of the electronic device 101 according to an embodiment.

In FIG. 9, unless otherwise described, the descriptions given with regard to FIG. 8 may be identically applied to the embodiment of FIG. 9. For convenience of description, repetitive descriptions may be omitted.

According to various embodiments, the electronic device 101 may further include the first insulating layer 740 disposed between the conductive layer 730 and the conductive adhesive layer 550. For example, the first insulating layer 740 may electrically insulate the conductive adhesive layer 550 from the conductive layer 730. According to an embodiment, the conductive adhesive layer 550 may be electrically coupled with the conductive layer 730 through the first insulating layer 740. Through the electrical coupling, at least part of a noise signal induced to the conductive layer 730 may be transferred to the first support member 411. Accordingly, the receiving sensitivities of the antennas associated with the first conductive radiator 613 and/or the second conductive radiator 623 may be prevented from being lowered by the noise signal from the driver IC of the printed circuit board 520. Because the conductive layer 730 and the conductive adhesive layer 550 are insulated from each other through the first insulating layer 740, a user may be prevented from getting an electric shock through the first support member 411 and the side bezel structure (e.g., the side bezel structure 410 of FIG. 4) from the conductive layer 730.

Figure 10:
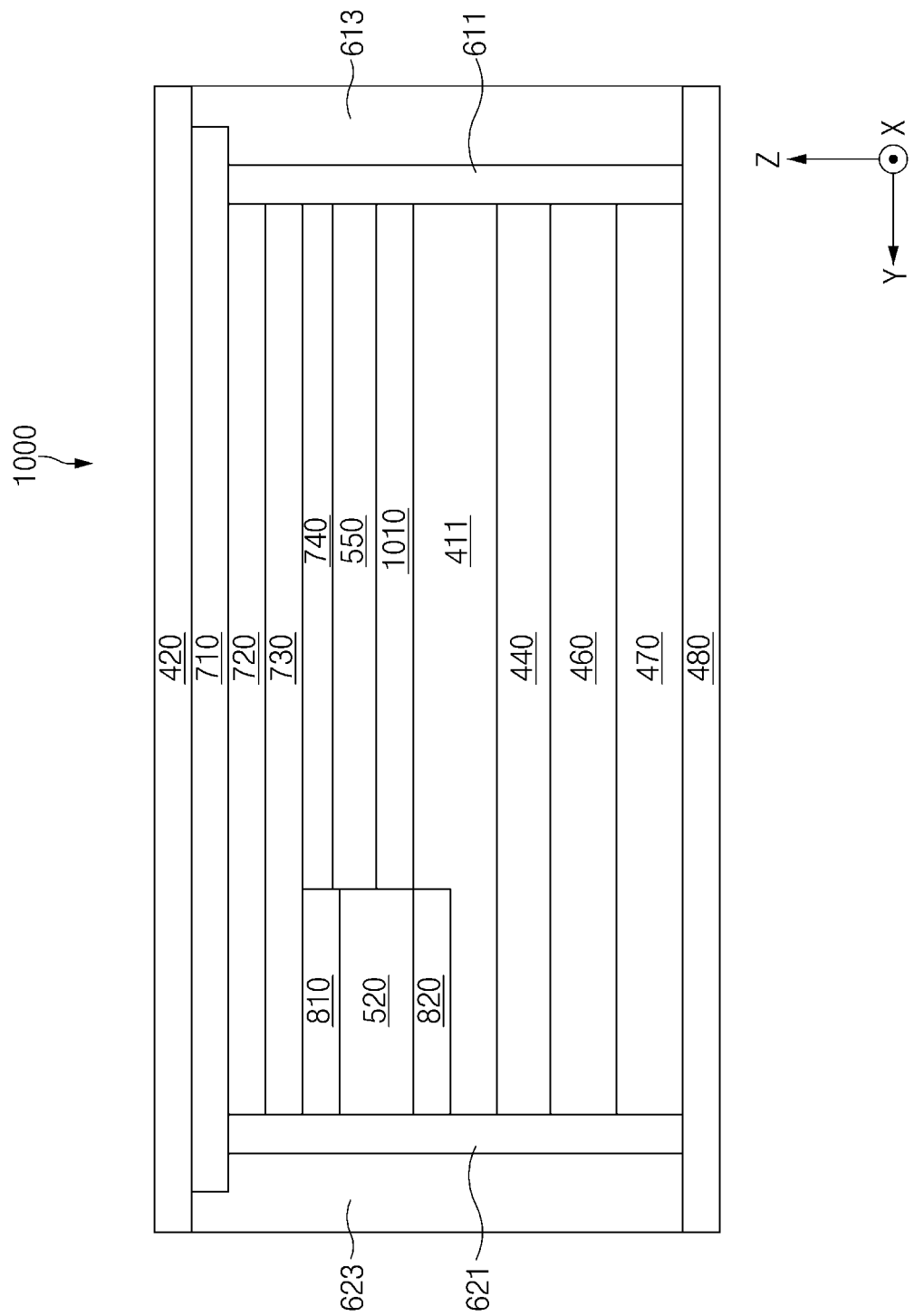
FIG. 10 is a view illustrating a section of the electronic device according to an embodiment.

FIG. 10 is a view 1000 illustrating a section of the electronic device 101 according to an embodiment.

In FIG. 10, unless otherwise described, the descriptions given with regard to FIGS. 8 and 9 may be identically applied to the embodiment of FIG. 10. For convenience of description, repetitive descriptions may be omitted.

According to various embodiments, the electronic device 101 may further include a second insulating layer 1010 disposed between the conductive adhesive layer 550 and the first support member 411. For example, the second insulating layer 1010 may electrically insulate the conductive adhesive layer 550 from the first support member 411. According to an embodiment, the conductive adhesive layer 550 may be electrically coupled with the first support member 411 through the second insulating layer 1010.

According to an embodiment, at least part of a noise signal induced to the conductive layer 730 may be transferred to the first support member 411 through the electrical coupling of the conductive layer 730 and the conductive adhesive layer 550 and the electrical coupling of the conductive adhesive layer 550 and the first support member 411. For example, the noise signal induced to the conductive layer 730 may be transferred to the first support member 411 through the two-step coupling. Accordingly, the receiving sensitivities of the antennas associated with the first conductive radiator 613 and/or the second conductive radiator 623 may be prevented from being lowered by the noise signal from the driver IC of the printed circuit board 520. Through the two-step coupling, a user may be prevented from getting an electric shock through the first support member 411 and the side bezel structure (e.g., the side bezel structure 410 of FIG. 4) from the conductive layer 730.

Table 1 shows changes of the receiving sensitivities (e.g., total isotropic sensitivities (TIS)) of a first antenna associated with the first conductive radiator 613 and a second antenna associated with the second conductive radiator 623 depending on ON/OFF of the display panel 710 in a specified frequency band (e.g., LTE B19 frequency band). Hereinafter, existing structures may refer to cases where a non-conductive adhesive tape is used instead of the conductive adhesive layer 550.

TABLE 1

| State of | First Antenna | | Second Antenna | |
|---|---|---|---|---|
| Display Panel | Existing Structure | Embodiment | Existing Structure | Embodiment |
| ON | −95.3 dBm | −95.2 dBm | −92.1 dBm | −92.1 dBm |
| OFF | −87.7 dBm | −93.8 dBm | −82.5 dBm | −90.3 dBm |
| TIS difference | 7.6 dBm | 1.4 dBm | 9.6 dBm | 1.8 dBm |

Table 2 shows changes of the receiving sensitivities (e.g., total isotropic sensitivities (TIS)) of the first antenna associated with the first conductive radiator 613 and the second antenna associated with the second conductive radiator 623 depending on ON/OFF of the display panel 710 in a specified frequency band (e.g., LTE B1 frequency band).

TABLE 2

| State of | First Antenna | | Second Antenna | |
|---|---|---|---|---|
| Display Panel | Existing Structure | Embodiment | Existing Structure | Embodiment |
| ON | −92.8 dBm | −92.9 dBm | −93.3 dBm | −93.2 dBm |
| OFF | −88.3 dBm | −92.0 dBm | −84.6 dBm | −91.5 dBm |
| TIS difference | 4.5 dBm | 0.9 dBm | 8.7 dBm | 1.7 dBm |

Table 3 shows changes of the receiving sensitivities (e.g., total isotropic sensitivities (TIS)) of the first antenna associated with the first conductive radiator 613 and the second antenna associated with the second conductive radiator 623 depending on ON/OFF of the display panel 710 in a specified frequency band (e.g., LTE B12 frequency band).

TABLE 3

| State of | First Antenna | | Second Antenna | |
|---|---|---|---|---|
| Display Panel | Existing Structure | Embodiment | Existing Structure | Embodiment |
| ON | −93.1 dBm | −91.8 dBm | −91.2 dBm | −91.2 dBm |
| OFF | −83.7 dBm | −89.8 dBm | −75.7 dBm | −86.3 dBm |
| TIS difference | 9.4 dBm | 2.0 dBm | 15.5 dBm | 4.9 dBm |

Accordingly, as shown in Table 1, Table 2, and Table 3, the reductions in receiving sensitivity may be improved for all the antennas over a wide frequency band by using the conductive adhesive layer 550.

According to an embodiment, the second insulating layer 1010 may be implemented as part of the conductive adhesive layer 550.

Figure 11:
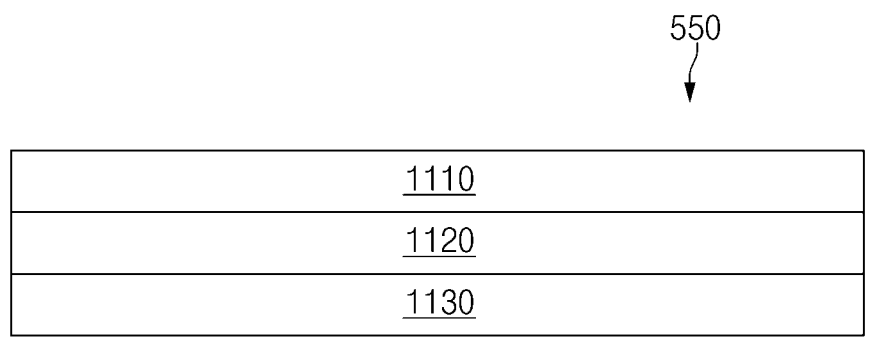
FIG. 11 is a view illustrating a configuration of the conductive adhesive layer according to an embodiment.

FIG. 11 is a view illustrating a configuration of the conductive adhesive layer 550 according to an embodiment.

Referring to FIG. 11, the conductive adhesive layer 550 may include a first adhesive layer 1110, a first conductive layer 1120, and a second adhesive layer 1130.

According to an embodiment, the first adhesive layer 1110 may be a heat reactive adhesive layer. For example, the first adhesive layer 1110 may be configured such that the adhesiveness thereof varies depending on temperature. According to an embodiment, the first adhesive layer 1110 may be a conductive adhesive layer or a non-conductive adhesive layer. For example, the first adhesive layer 1110 may be a heat reactive conductive pressure sensitive adhesive (HR CPSA). According to an embodiment, the first adhesive layer 1110 may be bonded to a first insulating layer (e.g., the first insulating layer 730 of FIG. 10).

According to an embodiment, the first conductive layer 1120 may be a layer formed of a metallic material. For example, the first conductive layer 1120 may be a conductive substrate including a copper foil or an aluminum foil.

According to an embodiment, the second adhesive layer 1130 may be attached to the first support member 411. According to an embodiment, the second adhesive layer 1130 may be a conductive adhesive layer or a non-conductive adhesive layer. For example, the second adhesive layer 1130 may correspond to the second insulating layer 1010 of FIG. 10. For example, the second adhesive layer 1130 may be a pressure sensitive adhesive (PSA).

Figure 12:
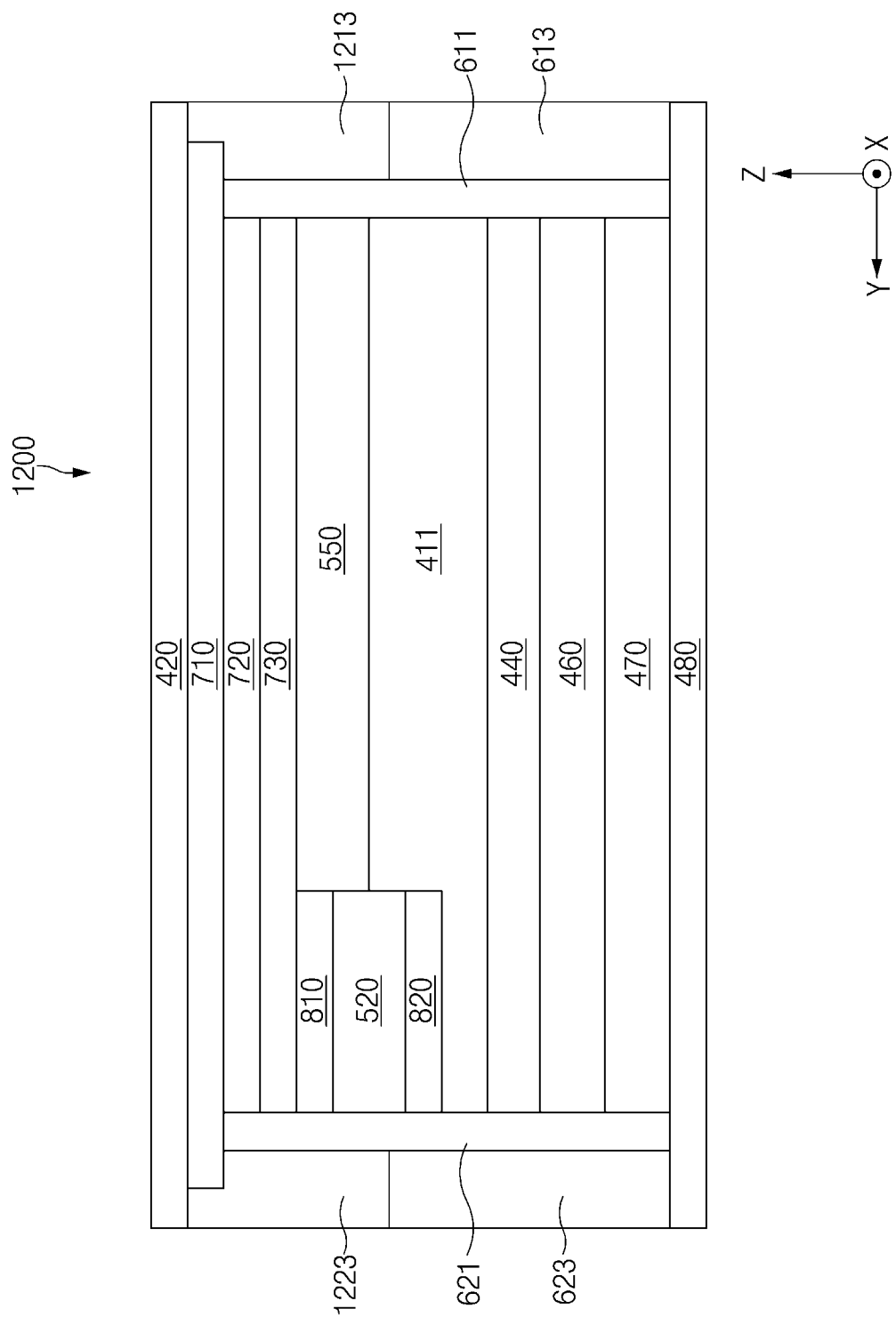
FIG. 12 is a view illustrating a section of the electronic device according to an embodiment.

FIG. 12 is a view 1200 illustrating a section of the electronic device 101 according to an embodiment.

In FIG. 12, unless otherwise described, the descriptions given with regard to FIG. 8 may be identically applied to the embodiment of FIG. 12. Furthermore, the embodiments described above with regard to FIGS. 9, 10, and 11 may be similarly applied to the structure of FIG. 12. For convenience of description, repetitive descriptions may be omitted.

According to various embodiments, conductive radiators (e.g., the first conductive radiator 611 and the second conductive radiator 621) of the side bezel structure (e.g., the side bezel structure 410 of FIG. 4) of the electronic device 101 may not overlap the conductive layer 730 when viewed from one side of the electronic device 101. For example, the conductive radiators may be disposed so as not to overlap the conductive layer 7230 on an axis (e.g., the Z-axis) perpendicular to the display of the electronic device 101.

Referring to FIG. 13, according to an embodiment, insulating areas 1213 and 1223 may be disposed in regions where the side bezel structure overlaps the conductive layer 730 on the Z-axis, and the conductive radiators 613 and 623 may be disposed in regions where the side bezel structure does not overlap the conductive layer 730 on the Z-axis. Because the distances between the conductive layer 730 and the conductive radiators 613 and 623 are increased, the strengths of electrical couplings between the conductive layer 730 and the conductive radiators 613 and 623 may be decreased. In this case, more noise signals induced to the conductive layer 730 may be transferred to the conductive layer 550 than in the embodiment of FIG. 8. Accordingly, a reduction in receiving sensitivity due to a noise signal may be further improved, as compared to that in the embodiment of FIG. 8.

According to various embodiments, a portable communication device (e.g., the electronic device 101 of FIG. 1) may include a display module (e.g., the display 430 of FIG. 4) that includes a display layer (e.g., the display panel 710 of FIG. 7) that faces toward a front surface of the portable communication device and a conductive layer (e.g., the conductive layer 730 of FIG. 7) that is formed under the display layer, a conductive supporting member (e.g., the first support member 411 and the side bezel structure 410 of FIG. 4) that is disposed under the conductive layer, an antenna module (e.g., the first antenna module 610 and/or the second antenna module 620 of FIG. 6) that is disposed close to a side of the conductive supporting member, a printed circuit board (e.g., the printed circuit board 520 of FIG. 5) that is disposed under the conductive layer and that has a display driver IC disposed thereon to control the display module, and a conductive adhesive layer (e.g., the conductive adhesive layer 550 of FIG. 5) that is disposed between the conductive layer and the conductive supporting member.

For example, the conductive adhesive layer may be formed such that at least part of noise generated from the display driver IC and induced to the conductive layer is transferred to the conductive supporting member through the conductive adhesive layer.

For example, the portable communication device may further include a first insulating layer (e.g., the first insulating layer 750 of FIG. 10) between the conductive adhesive layer and the conductive layer and a second insulating layer (e.g., the second insulating layer 1010 of FIG. 10) between the conductive adhesive layer and the conductive supporting member, and the conductive adhesive layer may be formed such that the noise is coupled from the conductive layer and is at least partially transferred to the conductive supporting member through the conductive adhesive layer.

According to an embodiment, the printed circuit board may have a first area, and the conductive adhesive layer may have a second area larger than the first area. For example, the second area of the conductive adhesive layer may be at least two times larger than the first area of the printed circuit board.

According to an embodiment, the printed circuit board may be disposed under a first region of the conductive layer, and the conductive adhesive layer may be disposed under a second region of the conductive layer.

According to an embodiment, when viewed from one side (e.g., the +X, −X, +Y, or −Y direction of FIG. 6) of the portable communication device, the conductive adhesive layer may be disposed to at least partially overlap the printed circuit board on an axis (e.g., the Z axis of FIG. 6) that is perpendicular to the conductive adhesive layer. For example, an insulating member may be disposed in a region where the conductive adhesive layer and the printed circuit board overlap each other.

According to an embodiment, when viewed from one side (e.g., the +X, −X, +Y, or −Y direction of FIG. 6) of the portable communication device, the conductive adhesive layer may be disposed so as not to overlap the printed circuit board on an axis perpendicular to the conductive adhesive layer.

According to an embodiment, the printed circuit board may be a flexible printed circuit board.

According to various embodiments, an electronic device (e.g., the electronic device 101 of FIG. 1) may include a display module (e.g., the display 439 of FIG. 4) that includes a display panel (e.g., the display panel 710 of FIG. 7) that has an upper surface disposed to face toward a front surface of the electronic device, a conductive layer (e.g., the conductive layer 730 of FIG. 7) that is disposed on a lower surface of the display panel, and a printed circuit board (e.g., the printed circuit board 520 of FIG. 5) that includes a driver IC of the display panel, a conductive supporting member (e.g., the side bezel structure 410 and the first support member 411 of FIG. 4) that is disposed under the conductive layer, a conductive radiator (e.g., the first conductive radiator 613 and/or the second conductive radiator 623 of FIG. 6) that is located on an upper or lower side of the electronic device so as to be adjacent to the conductive supporting member and that transmits and receives a wireless signal in a specified band, at least part of the conductive radiator being visible through a side surface of the electronic device, and a conductive adhesive layer (e.g., the conductive adhesive layer 550 of FIG. 5) that is located between the conductive layer and the conductive supporting member and that bonds at least part of the display module to the conductive supporting member.

According to an embodiment, the conductive adhesive layer may be formed such that at least part of noise generated from the driver IC and induced to the conductive layer is transferred to the conductive supporting member.

According to an embodiment, the electronic device may further include a first insulating layer (e.g., the first insulating layer 740 of FIG. 10) that is located between the conductive layer and the conductive adhesive layer, and at least part of the induced noise may be transferred to the conductive supporting member through electrical coupling between the conductive layer and the conductive adhesive layer and electrical connection between the conductive adhesive layer and the conductive supporting member.

According to an embodiment, the electronic device may further include a first insulating layer located between the conductive layer and the conductive adhesive layer, and the conductive adhesive layer may include a first conductive adhesive layer (e.g., the first adhesive layer 1110 and the first conductive layer 1120 of FIG. 11) that is located adjacent to the first insulating layer and a second insulating adhesive layer (e.g., the second adhesive layer 1130 of FIG. 11) that is located adjacent to the conductive supporting member.

For example, at least part of the induced noise may be transferred to the conductive supporting member through electrical coupling between the conductive layer and the first conductive adhesive layer and electrical coupling between the first conductive adhesive layer and the conductive supporting member.

For example, the first conductive layer may include a heat reactive adhesive layer (e.g., the first adhesive layer 1110 of FIG. 11) that is located adjacent to the first insulating layer and a metal layer (e.g., the first conductive layer 1120 of FIG. 11) that is located adjacent to the second insulating adhesive layer. For example, the heat reactive adhesive layer may have an adhesive force varying depending on temperature.

According to an embodiment, the electronic device may further include an insulating layer (e.g., 611 and 621 of FIG. 6) that physically connects the conductive radiator and the conductive supporting member and electrically isolates the conductive radiator and the conductive supporting member and that is located between the conductive radiator and the conductive supporting member.

For example, the electronic device may further include a main printed circuit board (e.g., the printed circuit board 440 of FIG. 4) that is located under the conductive supporting member, and the printed circuit board may be flexible printed circuit board and may be electrically connected with the main printed circuit board.

According to an embodiment, the conductive supporting member may be configured to provide a ground to the printed circuit board.

The invention claimed is:

1. A portable communication device comprising:
   a display module including a display layer configured to face toward a front surface of the portable communication device and a conductive layer formed under the display layer;
   a conductive supporting member disposed under the conductive layer;
   an antenna module disposed close to a side of the conductive supporting member;
   a printed circuit board disposed under the conductive layer, the printed circuit board having a display driver IC disposed thereon to control the display module; and
   a conductive adhesive layer disposed between the conductive layer and the conductive supporting member.

2. The portable communication device of claim 1, wherein the conductive adhesive layer is formed such that at least part of noise generated from the display driver IC and induced to the conductive layer is transferred to the conductive supporting member through the conductive adhesive layer.

3. The portable communication device of claim 2, wherein the portable communication device further comprises a first insulating layer between the conductive adhesive layer and the conductive layer and a second insulating layer between the conductive adhesive layer and the conductive supporting member, and
   wherein the conductive adhesive layer is formed such that the noise is coupled from the conductive layer and is at least partially transferred to the conductive supporting member through the conductive adhesive layer.

4. The portable communication device of claim 1, wherein the printed circuit board has a first area, and
   wherein the conductive adhesive layer has a second area larger than the first area.

5. The portable communication device of claim 4, wherein the second area of the conductive adhesive layer is at least two times larger than the first area of the printed circuit board.

6. The portable communication device of claim 1, wherein the printed circuit board is disposed under a first region of the conductive layer, and
   wherein the conductive adhesive layer is disposed under a second region of the conductive layer.

7. The portable communication device of claim 6, wherein when viewed from one side of the portable communication device, the conductive adhesive layer is disposed to at least partially overlap the printed circuit board on an axis perpendicular to the conductive adhesive layer.

8. The portable communication device of claim 7, wherein an insulating member is disposed in a region where the conductive adhesive layer and the printed circuit board overlap each other.

9. The portable communication device of claim 6, wherein when viewed from one side of the portable communication device, the conductive adhesive layer is disposed so as not to overlap the printed circuit board on an axis perpendicular to the conductive adhesive layer.

10. The portable communication device of claim 1, wherein the printed circuit board is a flexible printed circuit board.

11. An electronic device comprising:
    a display module including a display panel having an upper surface disposed to face toward a front surface of the electronic device, a conductive layer disposed on a lower surface of the display panel, and a printed circuit board including a driver IC of the display panel;
    a conductive supporting member disposed under the conductive layer;
    a conductive radiator located on an upper or lower side of the electronic device so as to be adjacent to the conductive supporting member and configured to transmit and receive a wireless signal in a specified band, at least part of the conductive radiator being visible through a side surface of the electronic device; and
    a conductive adhesive layer located between the conductive layer and the conductive supporting member and configured to bond at least part of the display module to the conductive supporting member.

12. The electronic device of claim 11, wherein the conductive adhesive layer is formed such that at least part of noise generated from the driver IC and induced to the conductive layer is transferred to the conductive supporting member through the conductive adhesive layer.

13. The electronic device of claim 12, further comprising:
    a first insulating layer located between the conductive layer and the conductive adhesive layer,
    wherein at least part of the induced noise is transferred to the conductive supporting member through electrical coupling between the conductive layer and the conductive adhesive layer and electrical connection between the conductive adhesive layer and the conductive supporting member through the conductive adhesive layer.

14. The electronic device of claim 12, further comprising:
    a first insulating layer located between the conductive layer and the conductive adhesive layer,
    wherein the conductive adhesive layer includes:
    a first conductive adhesive layer located adjacent to the first insulating layer; and a second insulating adhesive layer located adjacent to the conductive supporting member.

15. The electronic device of claim 14, wherein at least part of the induced noise is transferred to the conductive supporting member through electrical coupling between the conductive layer and the first conductive adhesive layer and electrical coupling between the first conductive adhesive layer and the conductive supporting member.

\* \* \* \* \*